(12) United States Patent
Wong et al.

(10) Patent No.: US 7,376,229 B1
(45) Date of Patent: May 20, 2008

(54) SYSTEM IDENTIFICATION MODULE FOR A COMMUNICATIONS SYSTEM

(75) Inventors: Doug Wong, Gloucester (CA);
Christopher Brown, Ottawa (CA);
Balwantrai Mistry, Nepean (CA);
Craig Suitor, Nepean (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1023 days.

(21) Appl. No.: 10/680,475

(22) Filed: Oct. 7, 2003

(51) Int. Cl.
*H04M 3/00* (2006.01)

(52) U.S. Cl. ............... 379/330; 379/322; 379/413

(58) Field of Classification Search ............. 379/330, 379/322, 413
See application file for complete search history.

(56) References Cited

U.S. PATENT DOCUMENTS

| | | | | |
|---|---|---|---|---|
| 4,742,475 A | * | 5/1988 | Kaiser et al. ............... 700/278 |
| 5,414,753 A | * | 5/1995 | Ehara ............................ 455/418 |
| 5,434,752 A | * | 7/1995 | Huth et al. ................... 361/798 |
| 5,911,121 A | * | 6/1999 | Andrews ...................... 455/418 |
| 6,920,527 B2 | * | 7/2005 | Cloutier et al. .............. 711/115 |

* cited by examiner

*Primary Examiner*—Quynh H. Nguyen
(74) *Attorney, Agent, or Firm*—Guerin & Rodriguez, LLP; William G. Guerin

(57) ABSTRACT

A system identification module for storing system specific information is described. The system includes a housing, a module connector and a persistent memory for storing system specific data associated with a communications system having a backplane. The housing and the module connector define an enclosure surrounding the persistent memory. The module connector can be electrically coupled to and removed from the backplane connector. The persistent memory can be a programmable read-only memory device. System specific information such as the system serial number, the date of manufacture, the system vintage and the common language equipment identifier (CLEI) code can be remotely accessed using the system identification module.

11 Claims, 3 Drawing Sheets

SYSTEM IDENTIFICATION MODULE FOR A COMMUNICATIONS SYSTEM

FIELD OF THE INVENTION

The invention relates generally to the interrogation of electronic equipment to determine its identity. In particular, the invention relates to replaceable identification modules for retaining product specific information that are mounted to the backplane of a communications system.

BACKGROUND

Electronic equipment used for communications is often structured in a rack mountable shelf format. A shelf typically includes multiple cards, or circuit packs that are interconnected through a backplane. Each card provides a service or function, such as an optical service, an Ethernet service, or a cross connect function. Each shelf can be distinguished from other shelves according to various shelf information, or backplane information, including, for example, product configuration, serial number and date of manufacture. Moreover, each shelf can have a set of unique identifiers such as Ethernet MAC addresses and a shelf serial number.

The task of identifying a shelf embedded in a communications network can be prohibitive due to the number of shelves deployed in the network. Because the backplane information is not known or recorded separately, a technician has to inspect the shelf directly to determine the specific shelf information. Memory devices can be used with the backplane to keep the identifier information. The memory devices are generally soldered or otherwise permanently connected to the backplane. Thus, if a memory device fails, repair of the memory device requires significant work and associated cost to retrieve the backplane and affect replacement of the device.

Accordingly, there exists a need for an identification module to permit retrieval of shelf specific information from shelves deployed in the field. The identification module should be field-replaceable to eliminate the effort and associated cost otherwise incurred when the shelf is removed from the field to replace a failed module. The present invention satisfies this need and provides additional advantages.

SUMMARY OF THE INVENTION

In one aspect, the invention features a system identification module having a housing, a persistent memory and a module connector. The persistent memory stores system specific data associated with a communications system having a backplane. The module connector is configured for coupling to and removal from the backplane connector, and to electrically connect the persistent memory to the backplane connector. The module connector and the housing define an enclosure surrounding the persistent memory.

In one embodiment, the persistent memory is a programmable read-only memory device. In a further embodiment, the persistent memory is an electrically eraseable programmable read-only memory device. In another embodiment, the system identification module also includes a shelf processor that controls the programming of the persistent memory and the reading of data from the persistent memory. In yet another embodiment, the housing has an outer surface with a ridged portion for grasping the system identification module when the system identification module is coupled to or remove from the backplane connector.

In another aspect, the invention features a communications shelf including a backplane, multiple communications cards and a system identification module. The backplane includes a backplane connector. The communications cards communicate with each other through the backplane. The system identification module is coupled to the backplane through the backplane connector and includes a housing, a persistent memory and a module connector. The persistent memory stores system specific data associated with the communications shelf. The module connector is configured for coupling to and removal from the backplane connector, and to electrically connect the persistent memory to the backplane connector. The module connector and the housing define an enclosure surrounding the persistent memory.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

In brief overview, the present invention relates to a system identification (SID) module for providing identification data specific to a system. The identification data can include information such as vintage, serial number and date of manufacture of the system. The SID module can be easily connected to or removed from the backplane of the system without the need for special tools or the need to remove the system from the field. More than one SID module can be connected to the backplane so that, in the event of a failure of one of the SID modules, identification data can still be retrieved from another SID module. In addition, the replacement SID module can be programmed in the field with the data stored in another SID module.

Figure 1:
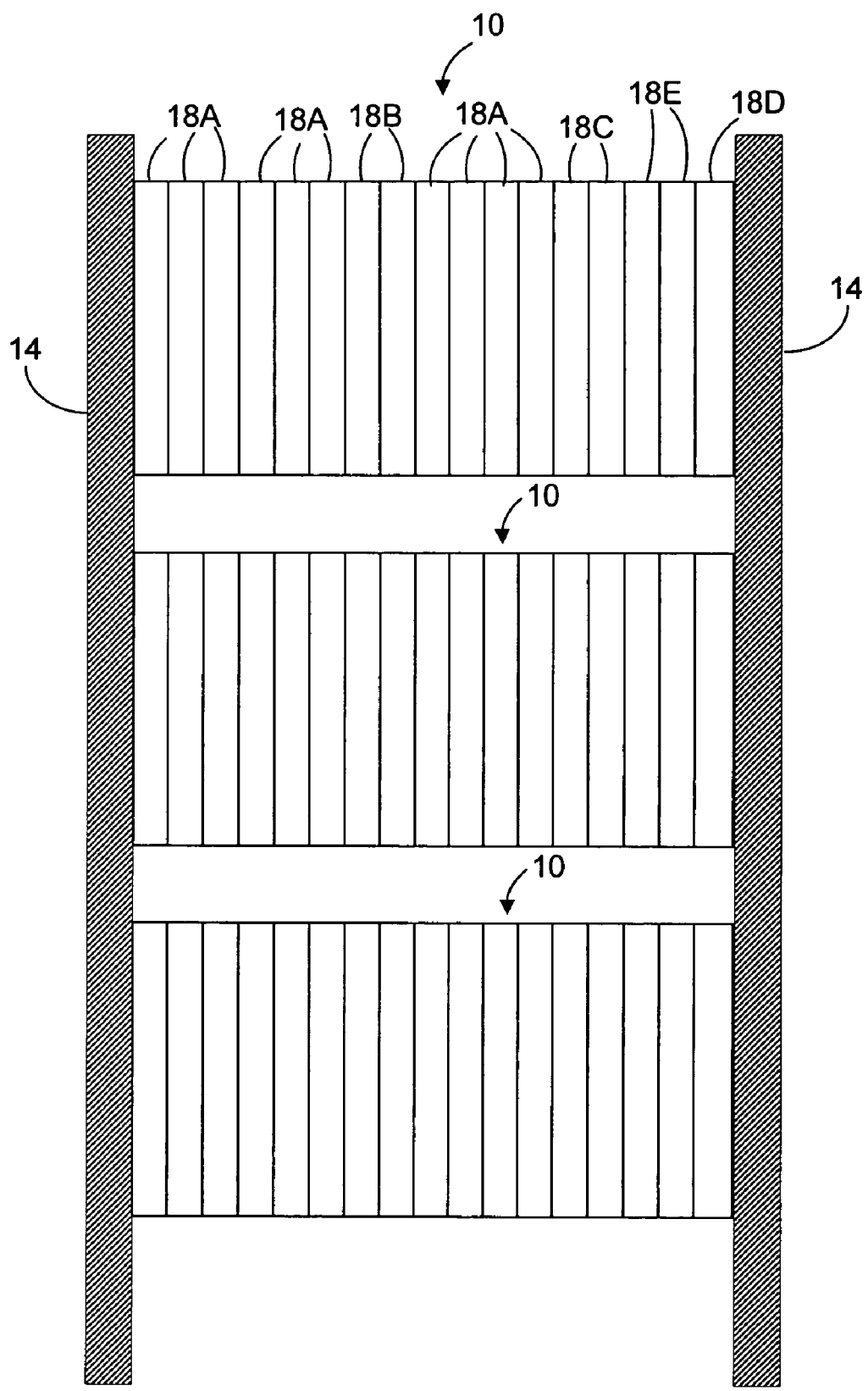
FIG. 1 illustrates a rack containing multiple communication systems.

FIG. 1 illustrates multiple communication systems 10 mounted in a rack 14. Only three communication systems 10 are shown in the rack 14 for clarity but a rack 14 can contain as many as four or more racks. Each communication system 10 (hereafter referred to as a shelf) includes communications cards, or circuit packs, 18 of various types. As shown for the upper shelf 10, several cards 18A are used to provide an optical service or an Ethernet service. The shelf 10 also include cross-connect cards 18B, protection switching cards 18C, a maintenance interface card 18D and redundant shelf processor cards 18E. Shelf control processes, such as service provisioning and alarm management, are managed by the shelf processors cards 18E. Each card 18 is connected to a backplane which provides communication paths for various communication and control signals transmitted between the cards 18.

Communication networks can include many thousands of shelves 10. The shelves 10 are typically deployed at numerous network sites. For example, a few hundred sites can be present on the network. Because each network site can have a large number of shelves 10, identification and/or retrieval of a specific shelf 10 can be a formidable task. The SID module of the present invention is coupled to the backplane of the shelf 10 and permits remote interrogation to determine information relevant to the specific shelf 10. The shelf processors 18E are responsible for communicating with the SID module and coordinating the programming (i.e., writing) of data into the SID module under the control of equipment support staff. In addition, the shelf processors 18E can communicate with an external management system to retrieve and transfer stored shelf data for inventory functions and other purposes. By way of example, the shelf specific data includes the shelf serial number, the date of manufacture, the shelf vintage (i.e., types or various levels of model specification) and a common language equipment identifier (CLEI) code provided by Telecordia. The SID module is located behind an access panel on the shelf 10 to allow for easy replacement in the field if the SID module fails.

Preferably, the backplane of each shelf 10 contains a second, or redundant, SID module. Thus, if one of the SID modules fails, shelf specific data is still available from the other SID module. Moreover, a technician can replace the failed SID module in the field. The technician removes the access panel and extracts the failed SID module from a backplane connector that mates with a connector on the SID module. The technician then inserts a replacement SID module into the backplane connector. The replacement SID module is programmed by copying data stored in the other SID module.

Figure 2A:
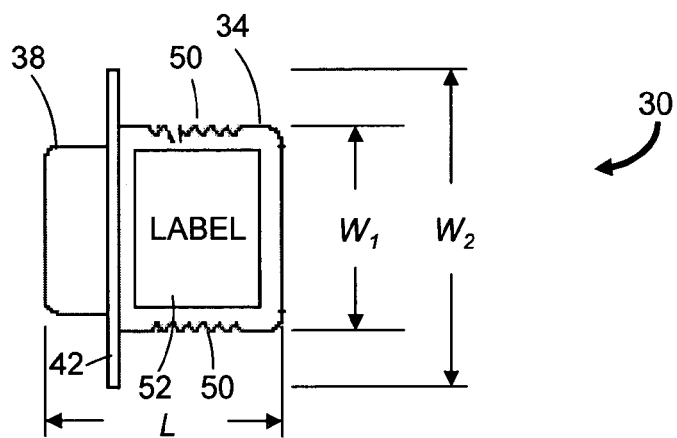
FIGS. 2A, 2B and 2C are a top view, end view and side view, respectively, of an embodiment of a system identification module in accordance with the invention.
Figure 2B:
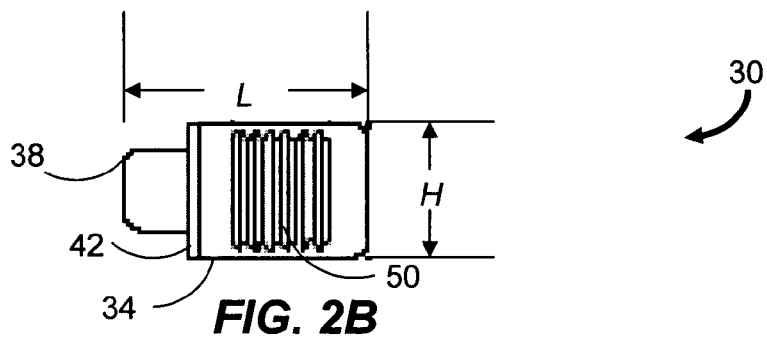
Figure 2C:
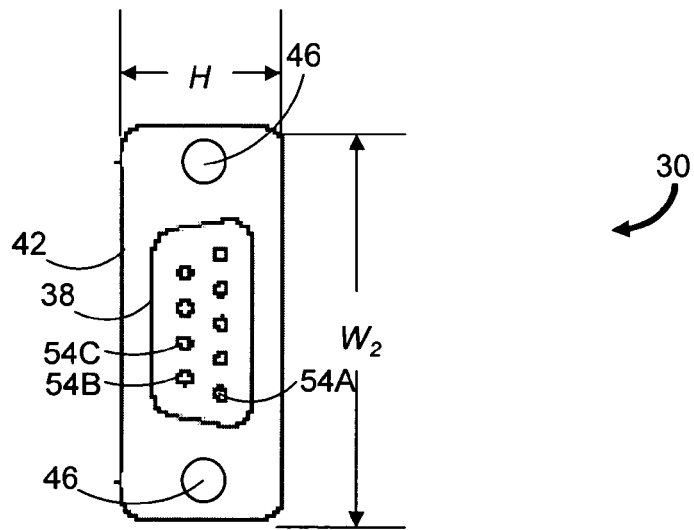

FIGS. 2A, 2B and 2C illustrate a top view, side view and end view, respectively, of a SID module 30 constructed according to the principles of the invention. The SID module 30 includes a housing 34 and a module connector 38 having multiple I/O pins 54. The housing 34 can be fabricated from a variety of materials including plastic. Inside the housing 34 is an electromagnetic compliant (EMC) shield to protect internal components. As shown, the module connector 38 is a 9-pin D-type serial connector (DB-9) (or RS-232 type connector) conforming to the EIA-232 (Electronic Industries Alliance) standard. The module connector 38 has a flange 42 with openings 46 to receive screws to secure the module connector 38 to a backplane connector. A ridged portion 50 along two sides of the outer surface of the housing 34 allows a technician to securely grasp the SID module 30 and aids in the coupling (i.e., insertion) and removal of the SID module 30 to the backplane connector. A label 52 attached to or formed on the housing includes one or more unique indicators used to identify the specific SID module 30.

The dimensions of the SID module 30 can be small and are typically limited by the size of the module connector 38 and/or a memory unit enclosed within the housing 34. For example, in the illustrated embodiment the SID module 30 has a length L less than one inch and a height H of approximately 0.5 inch. The SID module 30 has a housing width $W_1$ of approximately one inch and a total width $W_2$ (measured across the connector flange 42) of approximately 1.5 inch. In other embodiments, the dimensions of the SID module 30 vary and may be determined, for example, by design constraints such as the maximum backplane connector size allowed for the shelf 10.

Figure 3:
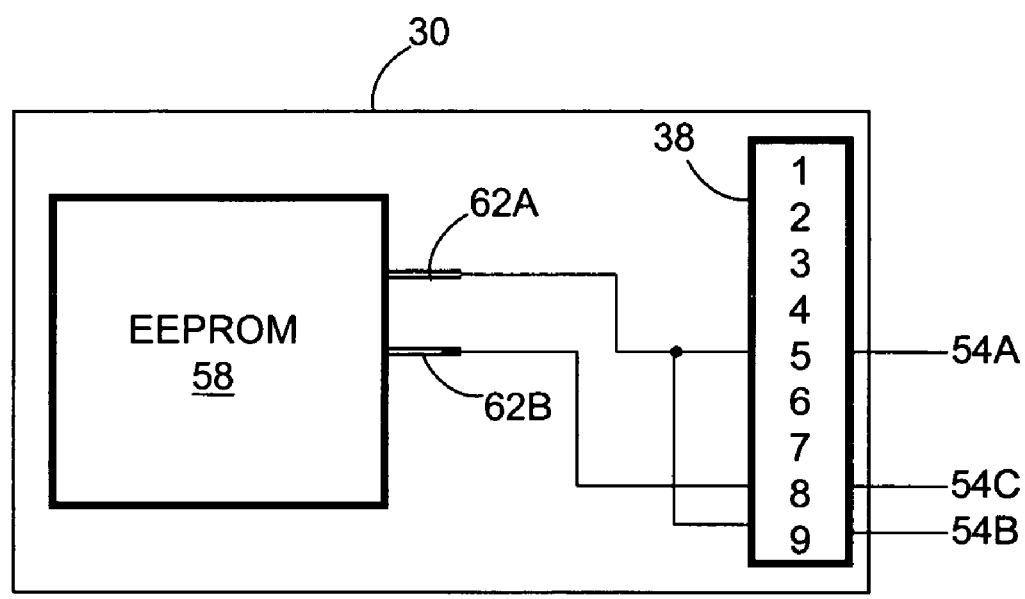
FIG. 3 is a schematic depiction of the system identification module of FIGS. 2A, 2B and 2C having an internal programmable read-only memory unit.

FIG. 3 schematically depicts the SID module 30 of FIGS. 2A, 2B and 2C. The nine pins 54 of the module connector 38 are displayed in a linear arrangement for clarity. The SID module 30 includes a persistent memory, in the form of a programmable read-only memory device (PROM) 58, electrically coupled to the module connector 38. In the illustrated embodiment, the PROM 58 is a 4 Kb electrically erasable PROM (EEPROM) (model number DS2433-ZO1 available from Dallas Semiconductor/Maxim Integrated Products, Inc. of Sunnyvale, Calif.). The EEPROM 58 requires only two leads 62 for operation. One lead 62A is coupled to a ground reference voltage via pin 5 54A of the module connector 38. The second lead 62B is coupled to pin 8 54C of the module connector 38 and is used to write data to and read data from memory. Advantageously, no separate leads are required to provide control data and address data to the EEPROM 58. Instead, such data is transmitted to the EEPROM 38 over the second lead 62B. In addition, the power to operate the EEPROM is derived from the data communications over the second lead 62B. Pin 9 54B of the module connector 38 is used for communication with the operating shelf processor card 18E which recognizes the presence of a functional SID module 30 by detecting the ground reference voltage.

The shelf specific data includes a plurality of system parameters. Each parameter has a data field stored in one or more partitioned areas of memory in the EEPROM 58. Because system parameters vary in bit length, the associated fields also vary in bit length. In the present embodiment, each field is an integer multiple of a minimum bit length. For example, system specific parameters can be assigned to 16 bit or 32 bit data fields, or data fields having lengths equal to multiples of these values.

The data stored in the SID module 30 are typically read during shelf startup and when the shelf 10 is in recovery mode (e.g., brownout recovery). Inventory commands from a management system can be sent to the shelf 10 to generate an inventory of all components in the system. During programming of the SID module 30, a checksum is generated from the data to be stored in specified, or predetermined, fields. The checksum is saved in a dedicated field in the SID module 30. To validate the integrity of the data read from the SID module 30, a checksum is calculated using the data read from the predetermined fields and compared with the checksum stored in the SID module 30. If the two checksum values do not match, the SID module 30 is considered to have failed (i.e., the stored data are unreliable). This data validation procedure can be performed any time the data in the predetermined fields of the SID module 30 are read.

While the invention has been shown and described with reference to specific preferred embodiments, it should be understood by those skilled in the art that various changes in form and detail may be made therein without departing from the spirit and scope of the invention as defined by the following claims. For example, although the description above is directed to a SID module for a communications shelf, the SID module can also be used to store and retrieve information for other forms of electronic equipment. Moreover, various aspects of the design of the SID module can vary. For example, the module connector can pass serial data or parallel data, and can have a variety of shapes and I/O pin configurations.

What is claimed is:

1. A system identification module comprising:
   a module housing;
   a persistent memory providing non-volatile data storage for storing system specific data associated with a communications system having a backplane; and
   a module connector secured to the module housing and electrically coupled to the persistent memory, the module connector adapted for attachment to and removal from the communications system at the backplane connector, the module connector and the module housing defining an enclosure surrounding the persistent memory, the module connector configured for electrically connecting the persistent memory to the communications system through the backplane connector.

2. The system identification module of claim 1 wherein the module housing has an outer surface, the outer surface having a ridged portion for grasping the system identification module when the system identification module is coupled to or removed from the backplane connector.

3. The system identification module of claim 1 further comprising a shelf processor, the shelf processor controlling the programming of the persistent memory and the reading of data from the persistent memory.

4. The system identification module of claim 1 wherein the persistent memory is a programmable read-only memory device.

5. The system identification module of claim 4 wherein the programmable read-only memory device is an electrically erasable programmable read-only memory device.

6. The system identification module of claim 4 wherein the programmable read-only memory device is a 2-pin electrically erasable programmable read-only memory device.

7. The system identification module of claim 1 wherein the persistent memory comprises a partitioned memory configured to receive data according to predefined data fields.

8. The system identification module of claim 1 wherein address information, data and power are transmitted to the persistent memory over a single input pin.

9. The system identification module of claim 1 wherein the module connector comprises a serial connector.

10. The system identification module of claim 9 wherein the serial connector is an RS-232 connector.

11. A communications shelf comprising:

a backplane having a backplane connector;

a plurality of communications cards in communication with each other through the backplane; and a system identification module coupled to the backplane through the backplane connector, the system identification module comprising:

a module housing;

a persistent memory providing non-volatile data storage for storing system specific data associated with the communications shelf; and a module connector for coupling to and removal from the backplane connector, the module connector and the housing defining an enclosure surrounding the persistent memory, the module connector electrically connecting the persistent memory to the backplane connector.

\* \* \* \* \*